United States Patent
Zhang et al.

(10) Patent No.: US 10,356,560 B2
(45) Date of Patent: Jul. 16, 2019

(54) INDICATION DIRECTION-BASED INSTRUCTION TRANSMISSION METHOD AND APPARATUS, SMART DEVICE AND STORAGE MEDIUM

(71) Applicant: ZTE Corporation, Shenzhen (CN)

(72) Inventors: Baisheng Zhang, Shenzhen (CN); Yuanyuan Xu, Shenzhen (CN); Min Fu, Shenzhen (CN); Jiangchao Qian, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/744,858

(22) PCT Filed: Aug. 31, 2015

(86) PCT No.: PCT/CN2015/088522
§ 371 (c)(1),
(2) Date: Jan. 15, 2018

(87) PCT Pub. No.: WO2017/016043
PCT Pub. Date: Feb. 2, 2017

(65) Prior Publication Data
US 2018/0270617 A1    Sep. 20, 2018

(30) Foreign Application Priority Data
Jul. 24, 2015    (CN) .......................... 2015 1 0444359

(51) Int. Cl.
*H04W 4/02*    (2018.01)
*G01S 5/02*    (2010.01)
(Continued)

(52) U.S. Cl.
CPC .......... *H04W 4/026* (2013.01); *G01S 5/0289* (2013.01); *H04L 67/125* (2013.01); *H04W 4/023* (2013.01);
(Continued)

(58) Field of Classification Search
CPC ....... H04W 4/80; H04W 8/005; H04W 48/16; H04W 4/02; H04W 4/023; H04W 4/025;
(Continued)

(56) References Cited

U.S. PATENT DOCUMENTS

| 8,886,541 B2 | 11/2014 | Friedlander | |
| 2004/0121784 A1* | 6/2004 | Park .................... | H04W 64/00 455/456.1 |

(Continued)

FOREIGN PATENT DOCUMENTS

| CN | 103095943 A | 5/2013 |
| CN | 104301868 A | 1/2015 |

(Continued)

OTHER PUBLICATIONS

International Search Report in international application No. PCT/CN2015/088522, dated Jan. 29, 2016.

(Continued)

Primary Examiner — Allahyar Kasraian
(74) Attorney, Agent, or Firm — Oppedahl Patent Law Firm LLC

(57) ABSTRACT

Disclosed are an indication direction-based instruction transmission method and apparatus, a smart device and a storage medium. According to the method, after a first smart device receives a first instruction, a current orientation of a set orientation on the first smart device is determined. It is detected whether there is at least one second smart device in the current orientation or not, and a first detection result is generated. When the first detection result represents that (Continued)

there is at least one second smart device in the current orientation, the first instruction is sent to at least one second smart device in the detected at least one second smart device to enable the at least one second smart device receiving the first instruction to execute the first instruction.

9 Claims, 4 Drawing Sheets

(51) Int. Cl.
    *H04L 29/08*     (2006.01)
    *H04W 4/80*     (2018.01)
    *H04W 4/70*     (2018.01)

(52) U.S. Cl.
    CPC ............. *H04W 4/027* (2013.01); *H04W 4/80* (2018.02); *H04W 4/70* (2018.02)

(58) Field of Classification Search
    CPC ..... H04W 76/14; H04W 4/021; H04W 4/026; H04W 48/04; H04W 64/006; H04W 76/23
    USPC ................................ 455/456.1–457, 418–420
    See application file for complete search history.

(56) References Cited

U.S. PATENT DOCUMENTS

| | | |
|---|---|---|
| 2005/0225453 A1 | 10/2005 | Chang |
| 2011/0191108 A1 | 8/2011 | Friedlander |
| 2012/0127012 A1 | 5/2012 | Gicklhorn |
| 2013/0342579 A1* | 12/2013 | Yu .......................... G09G 5/34 345/649 |
| 2015/0365248 A1 | 12/2015 | Zhang et al. |

FOREIGN PATENT DOCUMENTS

| | | |
|---|---|---|
| CN | 104460330 A | 3/2015 |
| CN | 104488233 A | 4/2015 |
| CN | 104635505 A | 5/2015 |
| EP | 2955860 A1 | 12/2015 |

OTHER PUBLICATIONS

English Translation of the Written Opinion of the International Search Authority in international application No. PCT/CN2015/088522, dated Jan. 29, 2016.

Supplementary European Search Report in European application No. 15899395.6, dated Apr. 17, 2018.

\* cited by examiner

INDICATION DIRECTION-BASED INSTRUCTION TRANSMISSION METHOD AND APPARATUS, SMART DEVICE AND STORAGE MEDIUM

TECHNICAL FIELD

The disclosure relates to a wireless instruction automatic transmission technology, and particularly to an indication direction-based instruction transmission method and apparatus, a smart device and a storage medium.

BACKGROUND

Along with continuous development of a wireless communication technology and a computer technology, there are more and more smart devices around the world, for example, a computer, a mobile phone, a tablet computer and smart home. Control over an smart device is mostly implemented through various applications installed in the smart device. Such an operating manner is unfavorable for use over the smart device by users, particularly in a scenario where there are a lot of smart devices.

SUMMARY

In order to solve the technical problem, embodiments of the disclosure provide an indication direction-based instruction transmission method and apparatus, a smart device and a storage medium.

The technical solutions of the embodiments of the disclosure are implemented as follows.

An indication direction-based instruction transmission method is provided. After a first smart device receives a first instruction, a current orientation of a set orientation on the first smart device is determined. It is detected whether there is at least one second smart device in the current orientation or not, and a first detection result is generated. When the first detection result represents that there is at least one second smart device in the current orientation, the first instruction is sent to at least one second smart device in the detected at least one second smart device to enable the at least one second smart device receiving the first instruction to execute the first instruction.

As an implementation mode, before it is detected whether there is at least one second smart device in the current orientation or not, the method may further include that a reference azimuth is set, and a virtual coordinate system is established based on the reference azimuth. The first smart device locates all of the second smart devices accessing a network which the first smart device currently accesses, and determines a relative position between the first smart device and each of the second smart devices accessing the network. A coordinate of each of the second smart devices accessing the network in the virtual coordinate system is determined based on the relative position.

As an implementation mode, the operation that the relative position between the first smart device and each of the second smart devices accessing the network is determined may include that distances between the first smart device and two second smart devices and a distance between the two second smart devices are calculated respectively, and a first triangle formed by the first smart device and the two second smart devices is determined. The first smart device is moved by a distance. The distances between the first smart device and the two second smart devices and the distance between the two second smart devices are recalculated, and a second triangle formed by the first smart device and the two smart devices is determined. A movement direction and a movement distance of the first smart device are determined, and coordinates of the two second smart devices in the virtual coordinate system are determined according to the first triangle and the second triangle.

As an implementation mode, when the first smart device is moved by a distance to mirror the first triangle and the second triangle, the method may further include that the first smart device is moved by a distance in a direction different from a first movement direction. The distances between the first smart device and the two second smart devices and the distance between the two second smart devices are calculated. A third triangle formed by the first smart device and the two second smart devices is determined. A movement direction and a movement distance of the first smart device before first or second movement are determined. The coordinates of the two second smart devices in the virtual coordinate system are determined according to the third triangle and the first triangle or the third triangle and the second triangle.

As an implementation mode, the operation that it is detected whether there is at least one second smart device in the current orientation or not may include that the reference azimuth is determined as the set orientation of the first smart device. When the first smart device is moved, current position information of the first smart device is determined. Coordinate information of all of the second smart devices is updated according to the current position information of the first smart device. An angle between each of the second smart devices and the reference azimuth is determined according to the coordinate information of all of the second smart devices. The second smart device with the smallest angle is determined as second smart device existing in the current orientation. When more than two second smart devices have the smallest angle, the second smart device closest to the first smart device is determined as a second smart device existing in the current orientation. When more than two second smart devices have the smallest angle, the second smart device closest to the first smart device is determined as a second smart device existing in the current orientation. When more than two second smart devices have the smallest angle and are closest to the first smart device, the more than two second smart devices are determined as a second smart device existing in the current orientation, or information of the more than two second smart devices is returned to a user, and the second smart device selected by the user is determined as a second smart device existing in the current orientation.

An indication direction-based instruction transmission apparatus is provided, including a receiving unit, a first determination unit, a detection unit and a sending unit.

The receiving unit is configured to receive a first instruction. The first determination unit is configured to determine a current orientation of a set orientation on a first smart device. The detection unit is configured to detect whether there is at least one second smart device in the current orientation or not, and generate a first detection result. The sending unit is configured to, when the first detection result represents that there is at least one second smart device in the current orientation, send the first instruction to at least one second smart device in the detected at least one smart device to enable the at least one second smart device receiving the first instruction to execute the first instruction.

As an implementation mode, the apparatus may further include a setting unit, an establishment unit, a positioning unit and a second determination unit.

The setting unit may be configured to set a reference azimuth. The establishment unit may be configured to establish a virtual coordinate system based on the reference azimuth. The positioning unit may be configured to locate all of the second smart devices accessing a current network, and determine a relative position between the first smart device and each of the second smart devices accessing the network. The second determination unit may be configured to determine a coordinate of each of the second smart devices accessing the network in the virtual coordinate system based on the relative position.

As an implementation mode, the positioning unit may include a first calculation subunit, a second calculation subunit and a determination subunit.

The first calculation subunit may be configured to calculate distances between the first smart device and two second smart devices and a distance between the two second smart devices respectively, and determine a first triangle formed by the first smart device and the two second smart devices. The second calculation subunit may be configured to, after the first smart device is moved by a distance, calculate the distances between the first smart device and the two second smart devices and the distance between the two second smart devices, and determine a second triangle formed by the first smart device and the two second smart devices. The determination subunit may be configured to determine a movement direction and a movement distance of the first smart device, and determine coordinates of the two second smart devices in the virtual coordinate system according to the first triangle and the second triangle.

As an implementation mode, the second calculation subunit may further be configured to, when the first smart device is moved by a distance to mirror the first triangle and the second triangle, after the first smart device is moved by a distance in a direction different from a first movement direction, calculate the distances between the first smart device and the two second smart devices and the distance between the two second smart devices, and determine a third triangle formed by the first smart device and the two second smart devices.

The determination subunit may further be configured to determine a movement direction and a movement distance of the first smart device before first or second movement, and determine the coordinates of the two second smart devices in the virtual coordinate system according to the third triangle and the first triangle or the third triangle and the second triangle.

As an implementation mode, the detection unit may further be configured to determine the reference azimuth as the set orientation of the first smart device; when the first smart device is moved, determine current position information of the first smart device, update coordinate information of all the second smart device according to the current position information of the first smart device, determine an angle between each of the second smart devices and the reference azimuth according to the coordinate information of all the second smart device, and determine the second smart device with the smallest angle as a second smart device existing in the current orientation; when more than two second smart devices have the smallest angle, determine the second smart device closest to the first smart device as a second smart device existing in the current orientation; when more than two second smart devices have the smallest angle, determine the second smart device closest to the first smart device as a second smart device existing in the current orientation; and when more than two second smart devices have the smallest angle and are closest to the first smart device, determine the more than two second smart devices as a second smart device existing in the current orientation, or return information of the more than two second smart devices to a user, and determine the second smart device selected by the user as a second smart device existing in the current orientation.

A smart device is provided including the abovementioned indication direction-based instruction transmission apparatus.

A storage medium is provided having a computer program stored therein, the computer program being configured to execute the indication direction-based instruction transmission method.

In the embodiments of the disclosure, after the first smart device receives the first instruction, the current orientation of the set orientation on the first smart device is determined. It is detected whether there is at least one second smart device in the current orientation or not, and the first detection result is generated. When the first detection result represents that there is at least one second smart device in the current orientation, the first instruction is sent to the at least one second smart device in the detected at least one second smart device to enable the at least one second smart device receiving the first instruction to execute the first instruction. According to the embodiments of the disclosure, one smart device is determined as an initiation party of a control instruction for other smart device(s). The control instruction is initiated to the other smart device(s) in an orientation through the orientation of the smart device, and the other smart device(s) receives and executes the control instruction. In such a manner, the user may control smart device without a special operation. Moreover, control over many other smart devices may be completed through one smart device, thereby greatly facilitating a control operation of the user over the other smart device(s), and improving user experience.

DETAILED DESCRIPTION

According to the embodiments of the disclosure, an operation instruction from a user is accurately sent to a target smart device based on position and direction recognition of each of smart devices according to the operation instruction and direction indication sent by operating smart devices. Then, the target smart device executes a control instruction from the user, so that the user may conveniently control each of smart devices. According to the embodiments of the disclosure, the control instruction may be sent to other smart device(s) through one smart device, thereby freely controlling the smart device(s).

Figure 1:
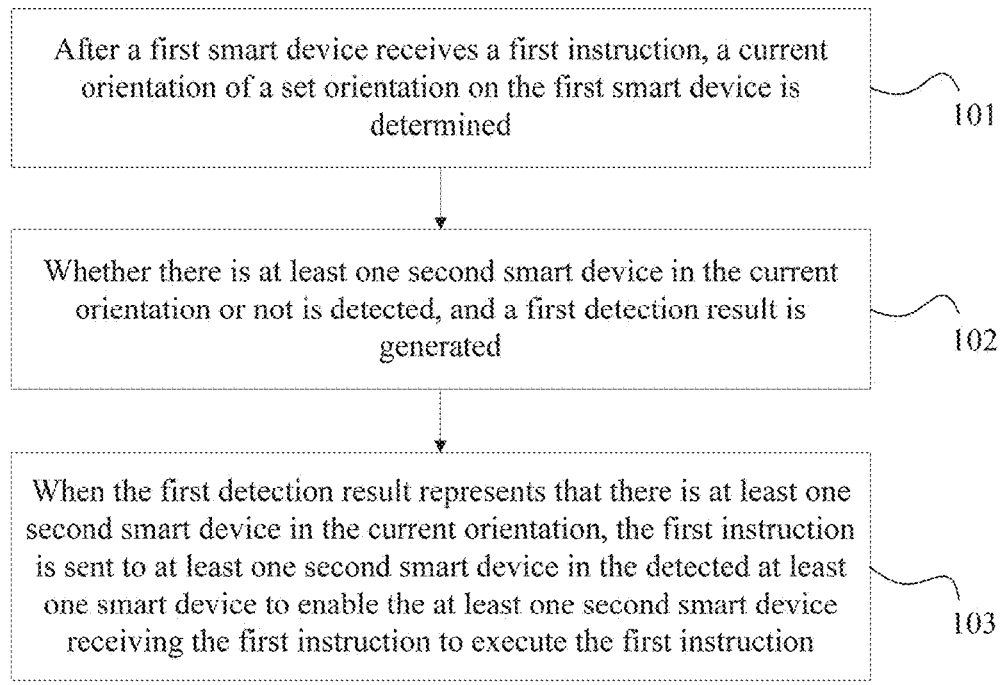
FIG. 1 is a flowchart of an indirection direction-based instruction transmission method according to an embodiment of the disclosure.

FIG. 1 is a flowchart of an indirection direction-based instruction transmission method according to an embodiment of the disclosure. As shown in FIG. 1, the indication direction-based instruction transmission method of the embodiment of the disclosure includes the following steps.

In step 101, after a first smart device receives a first instruction, a current orientation of a set orientation on the first smart device is determined.

In the embodiment of the disclosure, the first smart device may be a smart device frequently used by a user such as a mobile phone. The set orientation is set on the first smart device. The set orientation is configured to determine whether there is a second smart device in the current orientation or not. When a certain second smart device exists, it is determined as a default that the user sends an instruction to the second smart device in the set orientation, so that other second smart devices are prevented from mistakenly receiving the operation instruction and mistakenly executing the control instruction sent by the first smart device.

In Step 102, it is detected whether there is at least one second smart device in the current orientation or not, and a first detection result is generated.

When the user moves the first smart device, the first smart device determines the second smart device in the set orientation to find the second smart device receiving the operation instruction. When the user sends the operation instruction, it is determined as a default that the operation instruction is sent to the second smart device at a position in the set orientation.

In step 103, when the first detection result represents that there is at least one second smart device in the current orientation, the first instruction is sent to at least one second smart device in the detected at least one smart device to enable the at least one second smart device receiving the first instruction to execute the first instruction.

When it is found that the second smart device is in the set orientation, it is determined as a default that the first instruction is sent to the second smart device. Then, the second smart device receives the first instruction, and the second smart device executes the first instruction.

Before it is detected whether there is at least one second smart device in the current orientation or not, the method of the embodiment of the disclosure further includes that a reference azimuth is set, and a virtual coordinate system is established based on the reference azimuth. The first smart device locates all second smart devices accessing a network which the first smart device currently accesses, and determines a relative position between the first smart device and each of second smart devices accessing the network. A coordinate of each of second smart devices accessing the network in the virtual coordinate system is determined based on the relative position.

The reference azimuth is set on the first smart device, and the virtual coordinate system is established on the first smart device, so that the other second smart device(s) may be conveniently positioned, and a coordinate position of each of second smart devices in the virtual coordinate system may be determined.

Based on the virtual coordinate system on the first smart device, the operation that the relative position between the first smart device and each of second smart devices accessing the network is determined in the embodiment of the disclosure includes that distances between the first smart device and two second smart devices and a distance between the two second smart devices are calculated respectively, and a first triangle formed by the first smart device and the two second smart devices is determined. The first smart device is moved by a distance. The distances between the first smart device and the two second smart devices and the distance between the two second smart devices are recalculated. A second triangle formed by the first smart device and the two smart devices is determined. A movement direction and a movement distance of the first smart device are determined. Coordinates of the two second smart devices in the virtual coordinate system are determined according to the first triangle and the second triangle.

Based on the virtual coordinate system on the first smart device, when the first smart device is moved by a distance to mirror the first triangle and the second triangle, the indication direction-based instruction transmission method of the embodiment of the disclosure further includes that the first smart device is moved by a distance in a direction different from a first movement direction, the distances between the first smart device and the two second smart devices and the distance between the two second smart devices are calculated, and a third triangle formed by the first smart device and the two second smart devices is determined; and a movement direction and a movement distance of the first smart device before first or second movement are determined, and the coordinates of the two second smart devices in the virtual coordinate system are determined according to the third triangle and the first triangle or the third triangle and the second triangle.

Based on the virtual coordinate system on the first smart device, the operation that whether there is at least one second smart device in the current orientation or not is detected in the embodiment of the disclosure includes that the reference azimuth is determined as the set orientation of the first smart device. When the first smart device is moved, current position information of the first smart device is determined, coordinate information of all the second smart devices is updated according to the current position information of the first smart device, an angle between each of second smart devices and the reference azimuth is determined according to the coordinate information of all the second smart devices, and the second smart device with the smallest angle is determined as a second smart device existing in the current orientation; when more than two second smart devices have the smallest included angle, the second smart device closest to the first smart device is determined as a second smart device existing in the current orientation; when more than two second smart devices have the smallest included angle, the second smart device closest to the first smart device is determined as a second smart device existing in the current orientation; and when more than two second smart devices have the smallest angle and are closest to the first smart device, the more than two second smart devices are determined as second smart devices existing in the current orientation, or information of the more than two second smart devices is returned to a user, and the second smart device selected by the user is determined as a second smart device existing in the current orientation.

According to the embodiment of the disclosure, one smart device is determined as an initiation party of a control instruction for other smart device(s), the control instruction is initiated to the other smart device(s) in an orientation through the orientation of the smart device, and the other smart device(s) receives and executes the control instruction. In such a manner, the user may control a smart device without a special operation. Control over many other smart devices may be completed through one smart device, so that a control operation of the user over the other smart device(s) is greatly facilitated, and a user experience is improved.

The substance of the technical solutions of the embodiments of the disclosure will be further elaborated below with a specific example.

All of the smart devices in the embodiments of the disclosure, for example, a smart watch, a mobile phone and smart home, support a wireless network adopting a Round Trip Time (RTT) technology, for example, Wireless Fidelity (WiFi) and Bluetooth networks. In a common wireless network environment, each of smart devices may serve as a data transmission foundation and distance measurement and calculation and angle measurement and calculation of each of smart devices may be implemented based on the RTT technology. Based on measurement and calculation results, after a user sends an instruction (for example, a voice instruction), if a hand wearing a watch points to a device direction (for example, a computer in a study room) the instruction is to be sent to, a system may accurately send the instruction according to the measurement and calculation results. An example is as follows.

The smart devices, for example, a smart watch, a mobile phone and other smart device(s), all accesses the same network environment, for example, a WiFi or Bluetooth environment.

A first portable smart device, for example, a smart watch and a mobile phone, positions other smart device(s) in a network by virtue of RTT, including distance information and angle information. An angle with a reference direction is generated to determine the smart device the first portable smart device currently points to under assistance of a compass, a Global Positioning System (GPS), an electronic compass, a gyroscope or gravitational acceleration sensing equipment. Then, an instruction is sent, for example, "play the Cinderella" is sent in a voice manner.

A second smart device receives an operation instruction sent by a user via the first portable smart device, and parses and executes the operation instruction. For example, the second smart device supports a music playing function, and the operation instruction may be "playing a certain song." At this moment, the second smart device receives the operation instruction, parses a song name included in the instruction, turns on a player and starts playing the corresponding song.

According to the embodiment, an azimuth of other smart device is determined based on a sensor capable of generating an angle relative to the reference direction in a wireless RTT network or the like, for example, a compass, a GPS, an electronic compass, a gyroscope and a gravitational acceleration sensor. The operation instruction is sent to second electronic equipment in a set orientation of the first smart device. Then the second smart device executes the operation instruction, and the second smart device executes the operation instruction. The first smart device with a remote control function is only required to have the abovementioned sensor. For example, the first smart device in the example may be a smart bracelet, a watch or the like, and it has a capability of calculating the azimuth of the other smart device.

Figure 2:
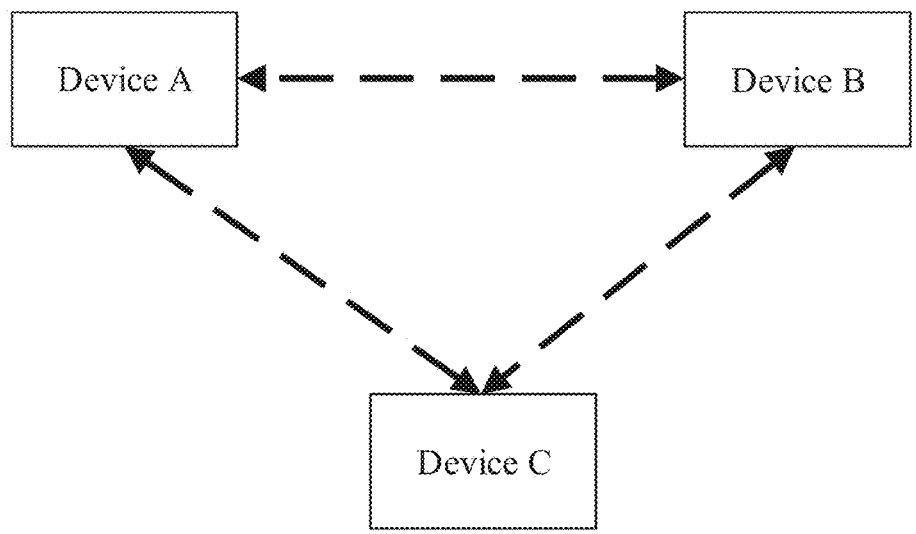
FIG. 2 is a schematic diagram of a triangle formed by a first smart device and two second smart devices according to an embodiment of the disclosure.

As shown in FIG. 2, in the embodiment of the invention, positions of two second smart devices relative to the first smart device are determined mainly through a triangle formed by the second smart device and the first smart device. As shown in FIG. 2, smart devices A, B and C form a triangle. Specifically, distances between the smart devices AB, AC and BC may be calculated through the wireless RTT technology, and angles between the three devices may be obtained according to the distances.

If there is only one second smart device besides the first portable smart device sending instructions, such as a smart watch and a mobile phone in the WiFi or Bluetooth network, the second smart device is not required to be positioned, and it is considered as a default that all the instructions of the first smart device are sent to the only second smart device in the current WiFi or Bluetooth network.

Figure 3:
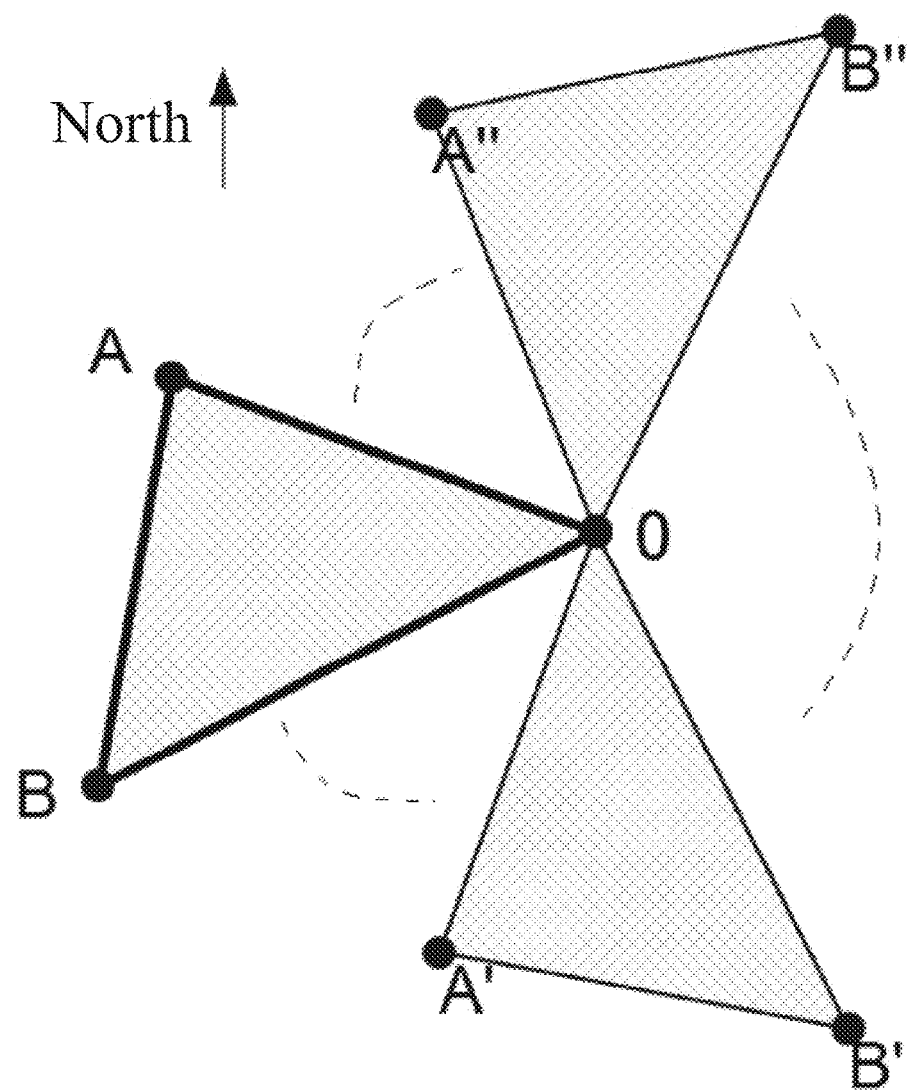
FIG. 3 is a schematic diagram of determining positions of second smart devices based on a triangle according to an embodiment of the disclosure.
Figure 4:
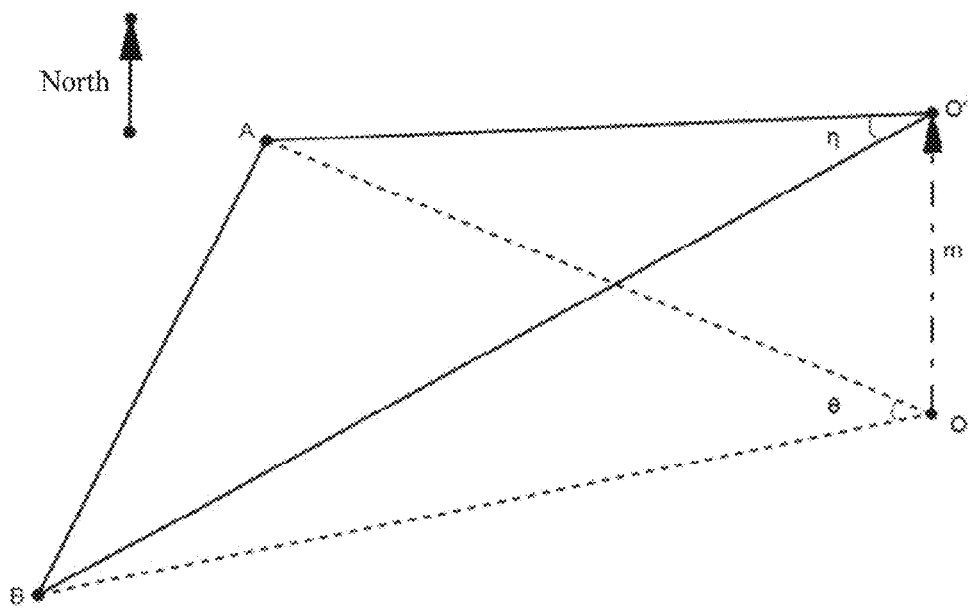
FIG. 4 is a schematic diagram of determining positions of second smart devices based on two triangles according to an embodiment of the disclosure.

When there is more than one smart device besides the first portable smart device sending the instructions in the WiFi network, as shown in FIG. 3, the first smart device O may position and calibrate any two second smart devices (device A and device B) in the network and calculate distances and angles of every two of the first smart device O, the device A and the device B by virtue of a WiFi RTT function according to current positions, thereby calculating a triangle formed by the device A, the device B and the first smart device O. The triangle has a determined size and shape with an undetermined position, and the position may be any direction of 360 degrees of rotation about the device O. Therefore, if the devices A and B are required to be accurately positioned, the first smart device O is required to change its own position and then determine the triangle formed by the first smart device O and the second smart devices A and B to implement accurate positioning of the second smart devices A and B. Specifically, the user may be prompted to move the mobile portable smart device by a distance m along a set orientation such as the due north and wait for measurement and calculation of new positions with WiFi RTT. In such a manner, a new triangle formed by the three smart devices may be obtained, as shown in FIG. 4.

Since the determined triangle has the determined size and shape and an angle between OO' and a physical direction (i.e. the due north) may be known through positioning equipment such as the compass on the first smart device O, distances between the devices A and B and the portable smart device O and angles between the devices A and B and their orientations may be determined. That is, the device A and the device B are positioned.

Figure 5:
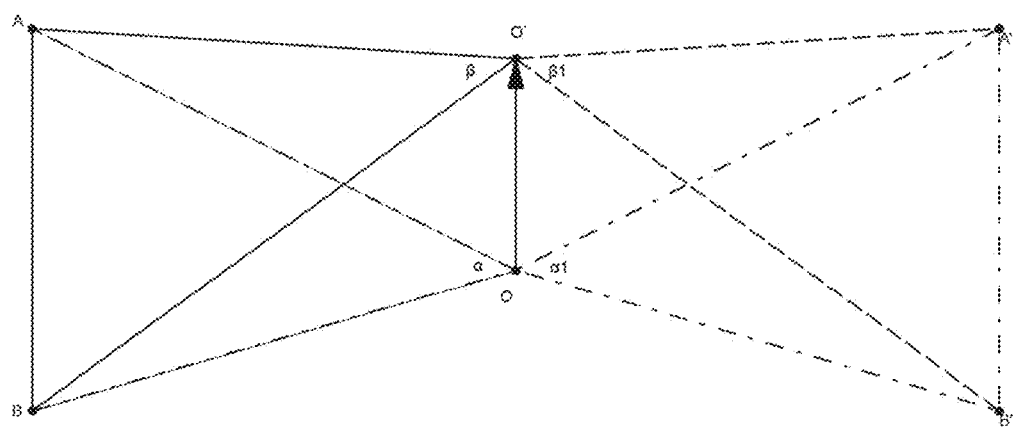
FIG. 5 is a mirroring diagram of triangles formed by a first smart device before and after movement and two second smart devices according to an embodiment of the disclosure.

A dynamic virtual coordinate system is established by taking the portable smart device as an origin and taking a direction the smart device points to as a real axis. As shown in FIG. 4, when the first smart device is at a point O, magnitudes of $\theta$, AO and BO may be measured. After movement to a point O', magnitudes of $\eta$, AO', BO and BO' may also be measured. For simplicity, a set orientation of the portable smart device may be overlapped with the true north of the compass during calibration and positioning. When OO' is not parallel to AB, positions of A and B may be uniquely determined. When OO' is parallel to AB, a condition shown in FIG. 5 may occur. That is, when OO' is parallel to AB, a triangle for calibration is mirrored with the triangle for previously calculating the positions of the second smart devices A and B. The positions of the second smart devices A and B may not be uniquely determined. At this moment, the user of the first smart device may be prompted to move the first smart device along another direction different from a previous movement direction by a distance n along a direction perpendicular to the previous movement direction for repositioning and recalibration, and then the physical positions of the second smart device A and the second smart device B may be uniquely determined.

In the embodiment of the disclosure, any two second smart devices and the first smart device may form an RTT triangle, so that all devices in the WiFi network may be positioned. In the embodiment of the disclosure, a distance between smart devices may be determined through a transmitting and receiving delay of a wireless signal between smart devices or the like.

In the embodiment of the disclosure, for convenient calculation, the coordinate system is established by taking the first smart device as the origin and taking its set orientation as a real axis of the coordinate system.

After the coordinate system is established, the first smart device performs position calibration on the other second smart device, and records coordinates of all the second smart devices in the wireless network. In the embodiment of the disclosure, a positioning manner for the second smart device may adopt the abovementioned manner of constructing triangles.

After being awakened from dormancy, the first smart device may measure distances and angles with any two devices by virtue of RTT, thereby determining its own position change. All the second smart devices in the network perform opposite movement relative to themselves (because the coordinate system always takes the first smart device as the origin), so that coordinates of all the equipment in the wireless network is updated. In the embodiment of the disclosure, there is made such a hypothesis that the second smart device is a static device. That is, most of the second smart devices is a device such as smart home or the like, and they are inconvenient to carry and also not required to be carried, so that it is usually inconvenient for the user to execute a short-distance operation on the smart home. Therefore, it is necessary to send a control instruction or the like to it by virtue of portable smart home, for example, the first smart device like a mobile phone.

When a new second smart device joins the network, the portable smart device may form two triangles with the newly joining device according to any two smart devices in the network, thereby calculating a coordinate of the newly joining smart device relative to the coordinate system of the portable smart device and further positioning it.

When the orientation of the portable smart device changes, the coordinates of all the devices in the wireless network may also change (only the angles change), and the portable smart device may update the coordinates (angles with the real axis and the distances) of all the smart devices in the wireless network, select the device with the smallest angle as a device the portable smart device (a mobile phone and a watch) points to from the devices of which the angles (i.e. angle components of the coordinates of the device) are smaller than 30 degrees or another threshold value (specifically set by the user), when more than one device has the smallest angle, select the device at a short distance according to the distances, and if both the angles and the distances are the same, prompt the user to move the position or angle of the portable smart device to select the device it is required to point to. In the embodiment of the disclosure, an object the first smart device is intended to send the control instruction to is determined by virtue of the set orientation of the first smart device. In the embodiment of the disclosure, the second smart device smaller than a set threshold angle in the set orientation of the first smart device is all determined as objects the first smart device is intended to send the control instruction to, and the set threshold angle may be 1 degree, 5 degrees, 10 degrees, 30 degrees or the like. When there are multiple second smart devices in the set orientation of the first smart device, the multiple second smart devices may all be determined as control instruction receiving parties, and the second smart device receiving the control instruction determines whether the control instruction sent by the user is sent to themselves or not by recognizing the received control instruction. Of course, a best manner is that, when there are multiple second smart devices in the set orientation, the user of the first smart device is notified to select one of them as a control instruction receiving party or determine one second smart device as the control instruction receiving party according to magnitudes of angles with the set orientation.

The method for positioning according to the triangle formed by the smart device in the embodiment of the disclosure will be further elaborated below in combination with FIG. 6. A specific positioning principle is as follows.

The virtual coordinate system is established by taking O as the origin and taking the orientation of the portable smart device (the first smart device) as the real axis, the coordinates of the device A and the device B before movement of the portable smart device are (AO, α) and (BO, β) respectively, the coordinates of the device A and the device B are changed into (AO', α) and (BO, β) respectively after movement to O', and according to a triangular relationship, it may be known that:

$$(xA)^2 + (yA)^2 = (OA)^2,$$

$$\tan x = \frac{yA}{xA},$$

$$(xB)^2 + (yB)^2 = (OB)^2,$$

$$\tan \beta = \frac{yB}{xB},$$

$$(xA')^2 + (yA')^2 = (O'A)^2,$$

$$\tan \alpha' = \frac{yA'}{xA'},$$

$$(xB')^2 + (yB')^2 = (O'B)^2,$$

$$\tan \beta' = \frac{yB'}{xB'},$$

$$xA - |OO'| = xA', \text{ and}$$

$$xB - |OO'| = xB'.$$

From the above formulae, dynamic coordinates of the device A and the device B, i.e. the distances between each of the device A and the device B and the portable smart device and the angles between the devices and the orientation of the portable smart device, in the coordinate system of the first smart device may be solved.

In the embodiment of the disclosure, when the second smart device is positioned, positions of the two second smart devices to be positioned are kept unchanged, and if the positions of the two second smart devices used during positioning change, although positioning may be implemented, positioning results may be deviated from practical positions.

When the user is required to operate a device in the wireless network, it is only necessary to point to the device with the smart device and then send an operation command, for example, turning on/off a lamp and turning on/off a television and an air conditioner, through an application.

The substance of the technical solutions of the embodiments of the disclosure will be further elaborated below by providing examples of some application scenarios.

Under the circumstance that there are multiple second smart devices in a house, if the second smart device is controlled through a voice, it is necessary to speak out a control object, for example, it is required to speak out that the television plays the song Cinderella through a voice instruction (it is more difficult to express if there are multiple televisions in the house) or go to the front of the corresponding second smart device and speak out the voice instruction: play the Cinderella, to it. The corresponding second smart device may output music to be played to the user after a series of processes of searching for a movie, preparing a cache and the like. If a control instruction is sent through the first smart device such as a smart watch in the embodiment of the disclosure, the voice instruction: play the Cinderella, may be input to the first smart device such as wearable equipment like a smart watch at a place far away from the second smart device, a direction of the second smart device selected for playing is pointed to, the control instruction may be sent to the second smart device, and the user may go for watching when the second smart device starts playing.

In the embodiment of the disclosure, when the user is required to send the control instruction to the second smart device, it is only necessary to input the control instruction through a portable smart device around the user, then the portable smart device points the second smart device to be controlled, and sends the control instruction to the second smart device to be controlled by an operation of clicking to send the control instruction and the like, and after receiving the control instruction, the second smart device to be controlled parses and executes the control instruction.

In the embodiment of the disclosure, as an implementation mode, after the portable smart device determines the second smart device in its set orientation, the control instruction to be sent may be encrypted by virtue of identification information of the second smart device. In such a manner, even though the control instruction sent by the portable smart device is received by other second smart device, it may not be correctly parsed, and a misoperation over the control instruction may be avoided. Of course, the second smart device may also be accurately positioned, and the corresponding control instruction is only sent to the second smart device to be operated by virtue of a beam forming technology and the like.

In the embodiment of the disclosure, a smart device is determined as an initiation party of a control instruction for other smart device(s), the control instruction is initiated to the other smart device(s) in an orientation through the orientation of the smart device, and the other smart device(s) receives and executes the control instruction. In such a manner, the user may control a smart device without a special operation. Control over many other smart devices may be completed through one smart device, so that a control operation of the user over the other smart device(s) is greatly facilitated, and a user experience is improved.

Figure 7:
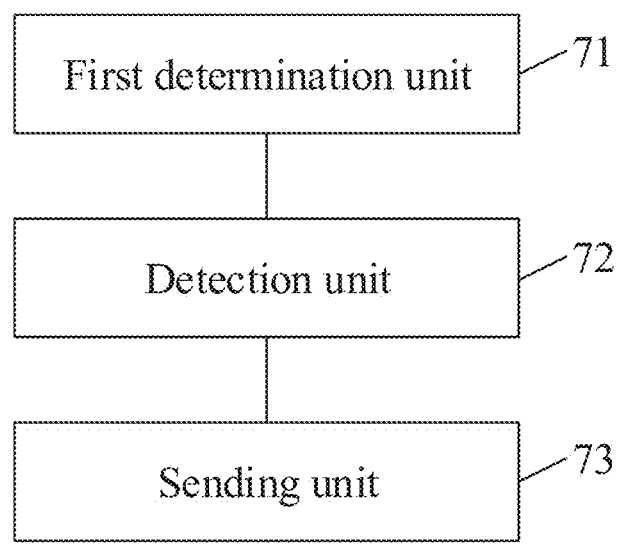
FIG. 7 is a structure diagram of an indirection direction-based instruction transmission apparatus according to an embodiment of the disclosure.

FIG. 7 is a structure diagram of an indication direction-based instruction transmission apparatus according to an embodiment of the disclosure. As shown in FIG. 7, the indication direction-based instruction transmission apparatus of the embodiment of the disclosure includes a receiving unit 70, a first determination unit 71, a detection unit 72 and a sending unit 73.

The receiving unit 70 is configured to receive a first instruction.

The first determination unit 71 is configured to determine a current orientation of a set orientation on a first smart device.

The detection unit 72 is configured to detect whether there is at least one second smart device in the current orientation or not, and generate a first detection result.

The sending unit 73 is configured to, when the first detection result represents that there is at least one second smart device in the current orientation, send the first instruction to at least one second smart device in the detected at least one smart device to enable the at least one second smart device receiving the first instruction to execute the first instruction.

In the embodiment of the disclosure, the first instruction may be a voice instruction, and may also be a non-voice operation instruction input by a user through the first smart device.

The first smart device is a portable smart device, for example, a smart watch and a mobile phone, convenient for the user to carry. The user may output the operation instruction to the second smart device through the first smart device.

Based on the indication direction-based instruction transmission apparatus shown in FIG. 7, the indication direction-based instruction transmission apparatus of the embodiment of the disclosure further includes a setting unit (not shown in the figure), an establishment unit (not shown in the figure), a positioning unit (not shown in the figure) and a second determination unit (not shown in the figure).

The setting unit is configured to set a reference azimuth.

The establishment unit is configured to establish a virtual coordinate system based on the reference azimuth.

The positioning unit is configured to position all second smart devices accessing a current network, and determine a relative position between the first smart device and each of the second smart devices accessing the network.

The second determination unit is configured to determine a coordinate of each of the second smart devices accessing the network in the virtual coordinate system based on the relative position.

The positioning unit of the embodiment of the disclosure includes a first calculation subunit (not shown in the figure), a second calculation subunit (not shown in the figure) and a determination subunit (not shown in the figure).

The first calculation subunit is configured to calculate distances between the first smart device and two second smart devices and a distance between the two second smart devices respectively, and determine a first triangle formed by the first smart device and the two second smart devices.

The second calculation subunit is configured to, after the first smart device is moved by a distance, calculate the distances between the first smart device and the two second smart devices and the distance between the two second smart devices, and determine a second triangle formed by the first smart device and the two smart devices.

The determination subunit is configured to determine a movement direction and a movement distance of the first smart device, and determine coordinates of the two second smart devices in the virtual coordinate system according to the first triangle and the second triangle.

The second calculation subunit is further configured to, when the first smart device is moved by a distance to mirror the first triangle and the second triangle, after the first smart device is moved by a distance in a direction different from a first movement direction, calculate the distances between the first smart device and the two second smart devices and the distance between the two second smart devices, and determine a third triangle formed by the first smart device and the two second smart device.

The determination subunit is further configured to determine a movement direction and a movement distance of the first smart device before first or second movement, and determine the coordinates of the two second smart devices in the virtual coordinate system according to the third triangle and the first triangle or the third triangle and the second triangle.

In the embodiment of the disclosure, the detection unit 72 is further configured to determine the reference azimuth as the set orientation of the first smart device; when the first smart device is moved, determine current position information of the first smart device, update coordinate information of all the second smart devices according to the current position information of the first smart device, determine an angle between each of second smart devices and the reference azimuth according to the coordinate information of all the second smart devices, and determine the second smart device with the smallest angle as a second smart device existing in the current orientation; when more than two second smart devices have the smallest included angle, determine the second smart device closest to the first smart device as a second smart device existing in the current orientation; when more than two second smart devices have the smallest included angle, determine the second smart device closest to the first smart device as a second smart device existing in the current orientation; and when more than two second smart devices have the smallest angle and are closest to the first smart device, determine the more than two second smart devices as second smart devices existing in the current orientation, or return information of the more than two second smart devices to a user, and determine the second smart device selected by the user as a second smart device existing in the current orientation.

Figure 6:
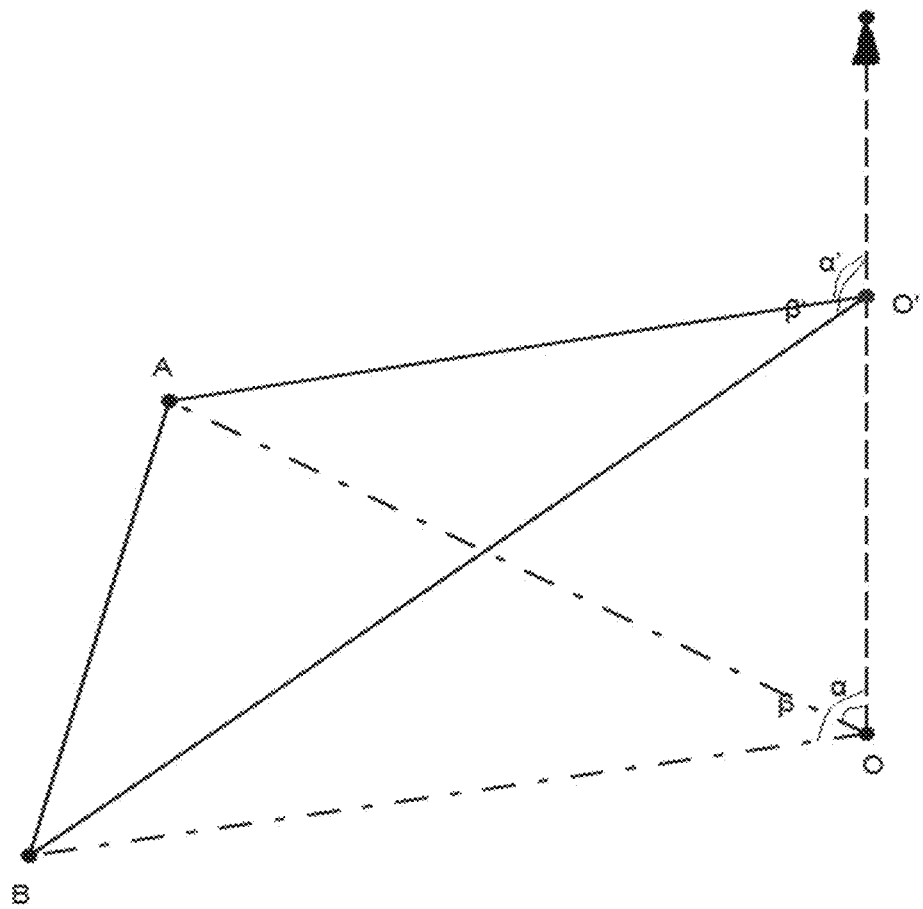
FIG. 6 is a principle diagram of determining positions of second smart devices based on a triangle according to an embodiment of the disclosure.

Those skilled in the art should know that a function realized by each processing unit in the indication direction-based instruction transmission apparatus shown in FIG. 6 may be understood with reference to the related descriptions about the indication direction-based instruction transmission method. The function of each unit in the indication direction-based instruction transmission apparatus shown in FIG. 6 may be realized through a program running on a processor, and may also be realized through a specific logic circuit.

According to the embodiment of the disclosure, one smart device is determined as an initiation party of a control instruction for other smart device(s), the control instruction is initiated to the other smart device(s) in an orientation through the orientation of the smart device, and the other smart device(s) receives and executes the control instruction. In such a manner, the user may control a smart device without a special operation. Control over many other smart devices may be completed through one smart device, so that a control operation of the user over the other smart device(s) is greatly facilitated, and a user experience is improved.

An embodiment of the disclosure further records a smart device, which includes the abovementioned indication direction-based instruction transmission apparatuses.

An embodiment of the disclosure further records a storage medium having a computer program stored therein, the computer program being configured to execute the indication direction-based instruction transmission method of each embodiment.

The technical solutions recorded by the embodiments of the disclosure may be freely combined without conflicts.

In some embodiments provided by the disclosure, it should be understood that the disclosed methods and smart devices may be implemented in another manner. The apparatus embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the apparatus or the units, and may be electrical and mechanical or adopt other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the disclosure according to a practical requirement.

In addition, each function unit in each embodiment of the disclosure may be integrated into a processing unit, each unit may also exist independently, and two or more than two unit may also be integrated into a unit. The abovementioned integrated unit may be implemented in a hardware form, and may also be implemented in form of hardware and software function unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

INDUSTRIAL APPLICABILITY

In the embodiments of the disclosure, after the first smart device receives the first instruction, the current orientation of the set orientation on the first smart device is determined. It is detected whether there is at least one second smart device in the current orientation or not, and the first detection result is generated. When the first detection result represents that there is at least one second smart device in the current orientation, the first instruction is sent to the at least one second smart device in the detected at least one smart device to enable the at least one second smart device receiving the first instruction to execute the first instruction. According to the embodiments of the disclosure, one smart device is determined as an initiation party of a control instruction for other smart device(s), the control instruction is initiated to the other smart device(s) in an orientation through the orientation of the smart device, and the other smart device(s) receives and executes the control instruction. In such a manner, the user may control a smart device without a special operation. Control over many other smart devices may be completed through one smart device, thereby greatly facilitating a control operation of the user over the other smart device(s) and improving user experience.

The invention claimed is:

1. An indication direction-based instruction transmission method, comprising:
after a first smart device receives a first instruction, determining a current orientation of a set orientation on the first smart device;
setting a reference azimuth, and establishing a virtual coordinate system based on the reference azimuth;
locating all second smart devices accessing a network which the first smart device currently accesses, and determining a relative position between the first smart device and each of the second smart devices accessing the network;

detecting whether there is at least one second smart device in the current orientation or not, and generating a first detection result; and when the first detection result represents that there is at least one second smart device in the current orientation, sending the first instruction to at least one second smart device in the detected at least one second smart device to enable the at least one second smart device receiving the first instruction to execute the first instruction;

wherein determining the relative position between the first smart device and each of the second smart devices accessing the network comprises:

calculating distances between the first smart device and two second smart devices respectively and a distance between the two second smart devices, and determining a first triangle formed by the first smart device and the two second smart devices;

moving the first smart device by a distance, recalculating the distances between the first smart device and the two second smart devices and the distance between the two second smart devices, and determining a second triangle formed by the first smart device and the two smart devices; and determining a movement direction and a movement distance of the first smart device, and determining coordinates of the two second smart devices in the virtual coordinate system according to the first triangle and the second triangle.

2. The method according to claim 1, before detecting whether there is at least one second smart device in the current orientation or not, further comprising:

determining a coordinate of each of the second smart devices accessing the network in the virtual coordinate system based on the relative position.

3. The method according to claim 2, wherein detecting whether there is at least one second smart device in the current orientation or not comprises:

determining the reference azimuth as the set orientation of the first smart device;

when the first smart device is moved, determining current position information of the first smart device, updating coordinate information of all of the second smart devices according to the current position information of the first smart device, determining an angle between each of second smart devices and the reference azimuth according to the coordinate information of all of the second smart devices, and determining the second smart device with the smallest angle as a second smart device existing in the current orientation; when more than two second smart devices have the smallest angle, determining the second smart device closest to the first smart device as a second smart device existing in the current orientation; and when more than two second smart devices have the smallest angle and are closest to the first smart device, determining the more than two second smart devices as second smart devices existing in the current orientation, or returning information of the more than two second smart devices to a user, and determining the second smart device selected by the user as a second smart device existing in the current orientation.

4. The method according to claim 1, when the first smart device is moved by a distance to mirror the first triangle and the second triangle, further comprising:

moving the first smart device by a distance in a direction different from a first movement direction, calculating the distances between the first smart device and the two second smart devices and the distance between the two second smart devices, and determining a third triangle formed by the first smart device and the two second smart devices; and determining a movement direction and a movement distance of the first smart device before first or second movement, and determining the coordinates of the two second smart devices in the virtual coordinate system according to the third triangle and the first triangle or the third triangle and the second triangle.

5. An indication direction-based instruction transmission apparatus, applied in a smart device and comprising:

a memory storing computer programs; and a processor executing the computer programs to implement a plurality of program units, wherein the plurality of program units comprise a receiving unit, a first determination unit, a setting unit, an establishment unit, a positioning unit, a detection unit and a sending unit, wherein the receiving unit is configured to receive a first instruction;

the first determination unit is configured to determine a current orientation of a set orientation on a first smart device;

the setting unit is configured to set a reference azimuth;

the establishment unit is configured to establish a virtual coordinate system based on the reference azimuth;

the positioning unit is configured to locate all of the second smart devices accessing a current network, and determine a relative position between the first smart device and each of the second smart devices accessing the network;

the detection unit is configured to detect whether there is at least one second smart device in the current orientation or not, and generate a first detection result; and the sending unit is configured to, when the first detection result represents that there is at least one second smart device in the current orientation, send the first instruction to at least one second smart device in the detected at least one second smart device to enable the at least one second smart device receiving the first instruction to execute the first instruction;

wherein the positioning unit comprises: a first calculation subunit, a second calculation subunit and a determination subunit, wherein the first calculation subunit is configured to calculate distances between the first smart device and two second smart devices and a distance between the two second smart devices respectively, and determine a first triangle formed by the first smart device and the two second smart devices;

the second calculation subunit is configured to, after the first smart device is moved by a distance, calculate the distances between the first smart device and the two second smart devices and the distance between the two second smart devices, and determine a second triangle formed by the first smart device and the two smart devices; and the determination subunit is configured to determine a movement direction and a movement distance of the first smart device, and determine coordinates of the two second smart devices in the virtual coordinate system according to the first triangle and the second triangle.

6. The apparatus according to claim 5, wherein the plurality of program units further comprise: a second determination unit,
    configured to determine a coordinate of each of the second smart devices accessing the network in the virtual coordinate system based on the relative position.

7. The apparatus according to claim 6, wherein the detection unit is further configured to:
    determine the reference azimuth as the set orientation of the first smart device;
    when the first smart device is moved, determine current position information of the first smart device, update coordinate information of all the second smart devices according to the current position information of the first smart device, determine an angle between each of the second smart devices and the reference azimuth according to the coordinate information of all the second smart devices, and determine the second smart device with the smallest angle as a second smart device existing in the current orientation; when more than two second smart devices have the smallest angle, determine the second smart device closest to the first smart device as a second smart device existing in the current orientation; and when more than two second smart devices have the smallest angle and are closest to the first smart device, determine the more than two second smart devices as second smart devices existing in the current orientation, or return information of the more than two second smart devices to a user, and determine the second smart device selected by the user as a second smart device existing in the current orientation.

8. The apparatus according to claim 5, wherein the second calculation subunit is further configured to, when the first smart device is moved by a distance to mirror the first triangle and the second triangle, after the first smart device is moved by a distance in a direction different from a first movement direction, calculate the distances between the first smart device and the two second smart devices and the distance between the two second smart devices, and determine a third triangle formed by the first smart device and the two second smart devices; and
    the determination subunit is further configured to determine a movement direction and a movement distance of the first smart device before first or second movement, and determine the coordinates of the two second smart devices in the virtual coordinate system according to the third triangle and the first triangle or the third triangle and the second triangle.

9. A non-transitory computer-readable storage medium, storing a computer program thereon, wherein the computer program is executed by a processor to implement an indication direction-based instruction transmission method, the method comprising:
    after a first smart device receives a first instruction, determining a current orientation of a set orientation on the first smart device;
    setting a reference azimuth, and establishing a virtual coordinate system based on the reference azimuth;
    locating all second smart devices accessing a network which the first smart device currently accesses, and determining a relative position between the first smart device and each of the second smart devices accessing the network;
    detecting whether there is at least one second smart device in the current orientation or not, and generating a first detection result; and
    when the first detection result represents that there is at least one second smart device in the current orientation, sending the first instruction to at least one second smart device in the detected at least one second smart device to enable the at least one second smart device receiving the first instruction to execute the first instruction;
    wherein determining the relative position between the first smart device and each of the second smart devices accessing the network comprises:
    calculating distances between the first smart device and two second smart devices respectively and a distance between the two second smart devices, and determining a first triangle formed by the first smart device and the two second smart devices;
    moving the first smart device by a distance, recalculating the distances between the first smart device and the two second smart devices and the distance between the two second smart devices, and determining a second triangle formed by the first smart device and the two smart devices; and
    determining a movement direction and a movement distance of the first smart device, and determining coordinates of the two second smart devices in the virtual coordinate system according to the first triangle and the second triangle.

* * * * *